United States Patent
Jeon et al.

(10) Patent No.: US 9,588,225 B2
(45) Date of Patent: Mar. 7, 2017

(54) APPARATUS FOR MEASURING POSITIONS OF OTHER APPARATUS AND METHOD THEREFOR

(71) Applicant: Electronics and Telecommunications Research Institute, Daejeon (KR)

(72) Inventors: Seo Hyun Jeon, Yongin (KR); Min Su Jang, Daejeon (KR); Dae Ha Lee, Daejeon (KR); Chang Eun Lee, Daejeon (KR); Hyun Ja Im, Daejeon (KR); Young Jo Cho, Seongnam (KR); Jae Hong Kim, Daejeon (KR); Jong Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 405 days.

(21) Appl. No.: 14/160,367

(22) Filed: Jan. 21, 2014

(65) Prior Publication Data

US 2014/0203197 A1 Jul. 24, 2014

(30) Foreign Application Priority Data

Jan. 22, 2013 (KR) .......................... 10-2013-0006849

(51) Int. Cl.
*G01S 17/74* (2006.01)

(52) U.S. Cl.
CPC .................................... *G01S 17/74* (2013.01)

(58) Field of Classification Search
CPC ...... B25J 13/08; G01S 1/70; G01S 2013/9314
See application file for complete search history.

(56) References Cited

U.S. PATENT DOCUMENTS

2011/0307121 A1* 12/2011 Matsuoka .............. G08G 1/164
701/1

FOREIGN PATENT DOCUMENTS

KR 10-2010-0086093 A 7/2010

* cited by examiner

*Primary Examiner* — Tony Ko

(57) ABSTRACT

Disclosed are an apparatus for measuring position of other apparatus and a method for the same. The apparatus may comprise at least one light emitting part transmitting a photo signal, at least one light receiving part receiving a photo signal transmitted from other apparatus, and a signal processing part controlling the at least one light emitting part to transmit the photo signal including identification information of itself, acquiring identification information of the other apparatus based on the photo signal received from the other apparatus, and acquiring a positional information of the other apparatus based on the acquired identification information of the other apparatus. Thus, the apparatus located in an arbitrary space may accurately acquire relative positional information of counterpart apparatuses.

17 Claims, 5 Drawing Sheets

APPARATUS FOR MEASURING POSITIONS OF OTHER APPARATUS AND METHOD THEREFOR

CLAIM FOR PRIORITY

This application claims priorities to Korean Patent Application No. 10-2013-0006849 filed on Jan. 22, 2013 in the Korean Intellectual Property Office (KIPO), the entire contents of which are hereby incorporated by references.

BACKGROUND

1. Technical Field

Example embodiments of the present invention relate to a technology of positioning, and more specifically to an apparatus for measuring position of other apparatuses, which can be used to measure relative positions between a plurality of apparatuses located in an arbitrary environment, and a method for the same.

2. Related Art

Generally, robot has been developed for industrial purpose, used for factory automation, or used for performing tasks on behalf of human in extreme environments in which human cannot perform tasks. Robotic engineering has been used for space development industry of high technology, and advanced persistently so that developments of human-friendly domestic robots become possible. Also, robot is being used, instead of medical devices, for treatment of biological tissues of human by introducing robot into human body which could not be treated by traditional medical devices.

According to the remarkable advances, the robotic engineering is becoming newly coming high technology substituting information revolution due to internet technology and biological engineering which has become popular as following the internet technology. For example, cleaning robots are representative examples which enlarge a scope of robotic engineering from industrial domain focusing on heavy industry to domestic domain focusing on light industry.

On the other hand, as necessities for mapmaking and target objective searching in extreme environment which human cannot access increase, a mobile robot has been used for performing such the tasks.

Especially, in the case that a map is made for a large area or a target objective is searched in a large area, used is a method that a plurality of robots is introduced and each robot of the plurality of robots is responsible of making a map corresponding to each divided region of the large area or searching the target objective in each divided region of the large area.

As described above, when a plurality of robots is introduced in a certain environment and each robot performs tasks in divided region corresponding to it, each robot should identify positional information of other robots in order to increase efficiency of the tasks.

That is, in order to prevent redundant task of robots, reduce time required for performing task, and integrate results of tasks performed by robots efficiently, it is preferable that each robot can identify positions of other robots, and perform its task in region which is not redundant with regions of the other robots.

As current methods for measuring pose of robot, a landmark is installed in a ceiling of space in which robots are located. Then, infrared transceivers equipped in the robots transmit infrared signals to the landmark and receive infrared signal reflected from the landmark. By using the infrared signal reflected from the landmark, poses and positions of the robots can be measured. However, in the above-described method, installing the landmark in the ceiling is a cumbersome task, and each robot should know positions of the landmark installed in advance. Therefore, the method cannot be used for general purposes.

Alternatively, being used is a method of installing a laser sensor in robot, and making each robot to use the laser sensor for scanning surrounding environments, acquiring two-dimensional map of the surrounding environments, and identifying its position based on the acquired two-dimensional map. However, although the method can enable each robot to identify position of itself, the method has shortcomings that each robot cannot identify its position accurately because a large amount of error may be generated when the surrounding environments have non-uniform surfaces.

Also, although the above mentioned two methods are being used currently, in the case that a plurality of robots is located in a specific space, there is a problem that each robot cannot determine positions of other robots in real time.

SUMMARY

Accordingly, example embodiments of the present invention are provided to substantially obviate one or more problems due to limitations and disadvantages of the related art.

Example embodiments of the present invention provide an apparatus for measuring position of other apparatus which can make each of a plurality of apparatuses acquire accurate positional information of other apparatus.

Also, example embodiments of the present invention provide a method performed in the apparatus for measuring position of other apparatus.

In some example embodiments, an apparatus for measuring position of a counterpart apparatus may comprise at least one light emitting part transmitting a photo signal; at least one light receiving part receiving a photo signal transmitted from the counterpart apparatus; and a signal processing part controlling the at least one light emitting part to transmit the photo signal including identification information of the apparatus, acquiring identification information of the counterpart apparatus based on the photo signal received from the counterpart apparatus, and acquiring positional information of the counterpart apparatus based on the acquired identification information of the counterpart apparatus.

Also, the identification information included in the photo signal transmitted by the at least one light emitting part may include at least one of a unique identification of the apparatus, a unique identification of the at least one light emitting part, and a transmit time of the photo signal including the identification information.

Also, the signal processing part may acquire at least one of a unique identification of the counterpart apparatus, a unique identification of a light emitting part equipped in the counterpart apparatus, and a transmit time of the photo signal transmitted from the counterpart apparatus based on the photo signal received from the counterpart apparatus.

Here, the signal processing part may calculate distance between the apparatus and the counterpart apparatus based on the transmit time of the photo signal transmitted from the counterpart apparatus and a receive time of the photo signal transmitted from the counterpart apparatus.

Here, the signal processing part may acquire pose information of the counterpart apparatus based on the unique identification of a light emitting part equipped in the counterpart apparatus.

Here, the signal processing part may acquire information on direction angle of the counterpart apparatus from the apparatus based on position and angle of a light receiving part, which receives the photo signal from the counterpart apparatus, among the at least one light emitting part.

Also, the at least one light emitting part and the at least one light receiving part may be configured to rotate along circumference of the apparatus, and the identification information includes information on position of the at least one light emitting part at a time when the at least one light emitting part transmits the photo signal including the identification information.

Here, the at least one light emitting part may perform flickering operation, or transmits the photo signal including the identification information by generating structured light.

Here, the apparatus may comprise a plurality of light emitting parts and a plurality of light receiving parts, and the plurality of light emitting parts and the plurality of light receiving parts may form emitting/receiving pairs each of which comprises a light emitting part and a light receiving part, and angles of photo signal emitted from each light emitting part included in each of the emitting/receiving pairs may be determined according to a total number of the emitting/receiving pairs.

In other example embodiments, an apparatus for measuring position of a counterpart apparatus may comprise at least one light emitting part transmitting a photo signal; at least one light receiving part receiving a photo signal transmitted from the counterpart apparatus; a communication part performing communications with the counterpart apparatus; and a signal processing part controlling the at least one light emitting part to transmit the photo signal including identification information of the apparatus, acquiring identification information of the counterpart apparatus based on the photo signal received from the counterpart apparatus, and transmitting a message for acquiring positional information of the counterpart apparatus based on the acquired identification information to the counterpart apparatus through the communication part.

Here, the identification information included in the photo signal transmitted from the at least one light emitting part may include a unique identification of the apparatus.

Here, the signal processing part may transmit a message directing the counterpart apparatus to pause movement after acquiring the identification information of the counterpart apparatus.

Here, the signal processing part may acquire positional information of the counterpart apparatus pausing movement by transmitting and receiving the photo signal to and from the counterpart apparatus after transmitting the message directing the counterpart apparatus to pause movement.

In still other example embodiments, a method for measuring position of a counterpart apparatus, performed in an apparatus, may comprise transmitting a photo signal including identification information for measuring position of the counterpart apparatus; acquiring identification information of the counterpart apparatus based on a photo signal received from the counterpart apparatus; and acquiring positional information of the counterpart apparatus using the acquired identification information of the counterpart apparatus.

Here, the photo signal transmitted may include at least one of a unique identification of the apparatus, a unique identification of a light emitting part transmitting the photo signal including the identification information, and a transmit time of the photo signal including the identification information.

Here, the identification information of the counterpart apparatus may include at least one of a unique identification of the counterpart apparatus, a unique identification of a light emitting part equipped in the counterpart apparatus, and a transmit time of the photo signal transmitted from the counterpart apparatus.

Here, distance between the apparatus and the counterpart apparatus may be acquired based on the transmit time of the photo signal transmitted from the counterpart apparatus and a receive time of the photo signal transmitted from the counterpart apparatus in the acquiring positional information.

Here, pose information of the counterpart apparatus may be acquired based on the unique identification of a light emitting part equipped in the counterpart apparatus in the acquiring positional information.

Here, information on direction angle of the counterpart apparatus from the apparatus may be acquired based on position and angle of a light receiving part receiving the photo signal from the counterpart apparatus among the at least one light emitting part in the acquiring positional information.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
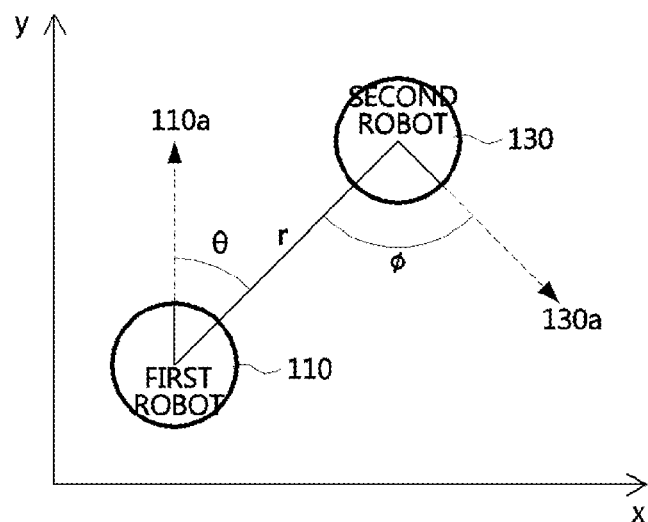
FIG. 1 is a conceptual diagram to explain how an apparatus identifies a position of other apparatus under measurement of position.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, in an apparatus and a method for measuring position according to example embodiments of the present invention, a meaning of a term 'positional information' is not limited to a physical distance between an apparatus for measuring position and an apparatus under measurement of position. The term 'positional information' may have a concept including angle between them and direction of the apparatus under measurement from the apparatus for measuring position as well as the physical distance between them.

Also, an apparatus described in example embodiments of the present invention may be an arbitrary apparatus acquiring positional information of the apparatus under measurement, and not limited to an apparatus having specific functions or forms. That is, the apparatus according to the present invention may be implemented in various forms and as a component to be included in an apparatus having various functions. For example, the apparatus may be implemented as a mobile robot, or a mean of transportation. Also, the apparatus may be installed as an auxiliary device for vehicle or robot. Hereinafter, for convenience of explanation, an example in which the apparatus is implemented as a robot is explained. However, as described above, example embodiments according to the present invention are not limited only to robot.

FIG. 1 is a conceptual diagram to explain how an apparatus identifies a position of other apparatus under measurement of position.

Referring to FIG. 1, in order for a first robot 110 to determine a position of a second robot 130, a distance between two robots, an angle between two robots, and a pose of the second robot 130 should be known to the robot 110.

For example, when the first robot 110 is a robot measuring position of the second robot 130 and the second robot 130 is a robot under measurement of position, the first robot 110 should identify that the second robot 130 is located at a point having direction angle θ from a specific direction of the first robot (for example, forward direction 110a) and distance of r from the first robot, and that the second robot 130 is heading for direction angle Φ in reference of a line connecting a center of the robot 110 and a center of the robot 130.

Also, in a perspective of the second robot 130 in FIG. 1, the second robot 130 may be a robot measuring position of other robot, and the first robot 110 may be a robot under measurement. In this case, the second robot 130 should identify that the first robot 110 is located at a point having an angle Φ from a specific direction of the second robot (for example, forward direction 130a) and distance of r from the second robot, and that the first robot 130 is heading for direction of angle θ in reference of a line connecting a center of the robot 110 and a center of the robot 130.

As shown in FIG. 1, in order for a robot to determine relative positional information of other robot, used is a method in which a camera and a marker identifiable by a camera are installed in each robot, and each robot identifies markers of other robots by using the camera, and each robot distances and angles of other robots based on information acquired from the identified markers. However, the above described method using the camera may have shortcomings of difficulties for acquiring positional information when the robots are located in dark environment since the cameras are sensitive to effect of light.

Also, used is another method in which a radio frequency transmitter is installed in each robot, and each robot transmits radio frequency, and each robot identifies distances of other robots based on strengths of signals received from other robots. However, such the method using received strength of radio frequency signal has shortcomings that it can identify only distance of a robot under measurement but a direction angle for which it is heading, and that accuracy of estimating position degrades in an environment having severe interferences to the radio frequency signal or in an environment changing rapidly.

In order to overcome the above described shortcomings, in an apparatus or a method according to an example embodiment of the present invention, provided are an apparatus and a method in which a plurality of light emitting elements or light receiving elements are used to measure a distance and an angle between a measuring apparatus and an apparatus under measurement, a pose of the apparatus under measurement.

Hereinafter, an apparatus or a method according to an example embodiment of the present invention will be explained in further detail by referring to the following figures.

Figure 2:
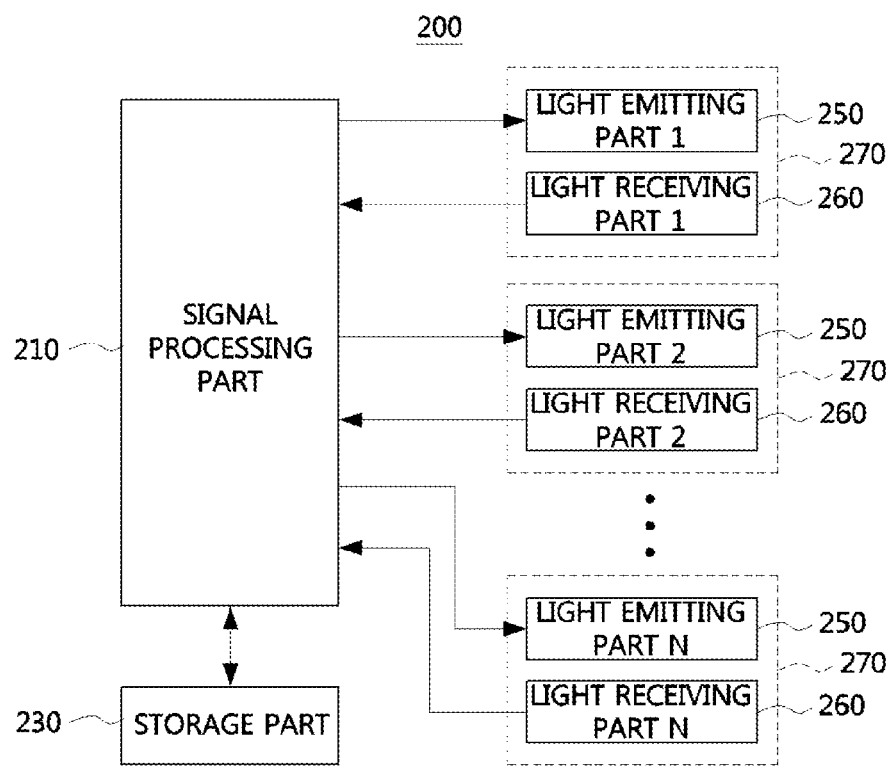
FIG. 2 is a block diagram to illustrate a configuration of an apparatus according to an example embodiment of the present invention.

FIG. 2 is a block diagram to illustrate a configuration of an apparatus according to an example embodiment of the present invention.

Referring to FIG. 2, the apparatus 200 according to an example embodiment of the present invention may comprise a signal processing part 210, a storage part 230, at least one light emitting part 250, and at least one light receiving part 260. Here, the apparatus 200 may have only one light emitting part 250 and one light receiving part 260, or may have a plurality of light emitting parts 250 and a plurality of light receiving parts 260.

Meanwhile, the apparatus 200 may be implemented as a mobile or vehicular apparatus such as a robot, and may include additional components performing fundamental functions of robot when it is implemented as a robot.

Hereinafter, the apparatus 200 may be assumed to be implemented as a robot, and the apparatus 200 may be referred to as 'robot 200' for convenience of explanation. Also, other apparatus position of which is measured by the apparatus 200 may be assumed to be implemented as a robot, and may be referred to 'counterpart robot' for convenience of explanation.

As an example, the signal processing part 210 may be implemented using a processor, and may control operations of at least one light emitting part 250 and at least one light receiving part 260. Also, the signal processing part 210 may perform a signal processing to acquire positional information of the counterpart robot based on photo signal received from the counterpart robot through the light receiving part 260.

Specifically, the signal processing part 210 may control the light emitting part 250 to transmit a photo signal including identification information for other apparatus (counterpart robot) to measure position of the robot 200 in a predefined manner. Here, when the apparatus 200 has a plurality of light emitting parts 250, the signal processing part 210 may select a specific light emitting part among the plurality of light emitting parts, and control the selected light emitting part to transmit the photo signal including the identification information.

Here, the identification information may include at least one of a unique identification information (Hereinafter, referred as 'robot ID') of the robot 200, a unique identification information (Hereinafter, referred as 'light emitting part ID') of a light emitting part transmitting the photo signal including the identification information, and a transmit time information of the photo signal including the identification information.

Alternatively, when the robot 200 has only one light emitting part 250, the light emitting part 250 may be configured to rotate along circumference of the robot 200, and the identification information includes information on position and angle of the light emitting part at a time when the light emitting part transmits the photo signal including the identification information.

For example, when the robot 200 has a plurality of light emitting parts 250 and a first light emitting part 250 transmits the photo signal, the signal processing part 210 may encode the identification information by including an ID of the robot 200, an ID of the first light emitting part 250, and a transmit time of the photo signal transmitted from the first light emitting part 250, and control the first light emitting part 250 to transmit the encoded identification information.

On the other hand, in order for the robot 200 to measure a distance to the counterpart robot by using the transmit time of the photo signal, time synchronization between the robots is required to be established in advance. The time synchronization may be established using a global positioning system (GPS), and a procedure for the time synchronization may be performed at an arbitrary time before measuring position is started.

Also, the signal processing part 210 may control at least one light emitting part 250 to transmit data for communications with other robots or data including the identification information.

Also, when the signal processing part 210 receives electric signal corresponding to a photo signal from at least one light receiving part 260, the signal processing part 210 may acquire identification information of the counterpart robot which transmitted the photo signal (that is, an ID of the counterpart robot, an ID or a positional information of light emitting part of the counterpart robot, a transmit time information of the photo signal transmitted from the light emitting part of the counterpart robot).

Then, the signal processing part 210 may acquire information on a distance from the robot 200 to the counterpart robot, a direction angle of the counterpart robot from the robot 200, and a pose of the counterpart robot. For example, the signal processing part 210 may calculate the distance from the robot 200 to the counterpart robot based on difference between a receive time of the photo signal and the transmit time of the photo signal included in the identification information. Also, the signal processing part 210 may calculate an angle of the counterpart robot based on position and angle of light receiving part which received the photo signal, and may acquire the pose (information on direction for which the counterpart robot is heading) of the counterpart robot based on the position and angle included in the identification information of the photo signal.

Here, the information on pose of the counterpart robot may include at least one of a vertical angle of direction for which the counterpart robot is heading, and a horizontal angle of direction for which the counterpart robot is heading, and an altitude of the counterpart robot.

On the other hand, when the robot 200 has a plurality of light emitting parts 250, the signal processing part 210 may control all the light emitting parts to transmit photo signals including identification information for each of the light emitting parts at early time of measuring position or at arbitrary time. Then, when the signal processing part 210 receives a photo signal from a robot located in a specific direction, the signal processing part 210 may control only a light emitting part heading for the specific direction to transmit a photo signal including identification information. Through the above described procedure, it may become easy to discover other robots and measure position of a discovered robot when a plurality of other robots exists in an environment.

Alternatively, the signal processing part 210 may control a plurality of light emitting parts 250 to transmit photo signals sequentially according to a predetermined time interval, or may control at least one specific light emitting part of the plurality of light emitting parts selectively to transmit photo signals including the identification at a predetermined time or according to a predetermined interval.

Also, when the signal processing part 210 receives a photo signal including data other than identification information from other robot, the signal processing part 210 may obtain the data by processing the received photo signal and perform processes corresponding to the obtained data.

The storage part 230 may be configured with a nonvolatile memory (such as a flash memory), and store identification information (that is, an ID of robot 200 and IDs of light emitting parts). Also, the storage part 230 may store identification information of other robots, a program code performing a method for measuring position based on the identification information of other robots, and positional information of other robots acquired through execution of the program code.

The light emitting part 250 may include a light emitting element capable of transmitting a photo signal, and transmit photo signal under control of the signal processing part 210. Here, it is preferable that the light emitting part 250 is configured to generate photo signals having property of straightness such as laser or infrared signals. Thus, the light emitting part may comprise a laser light emitting diode or an infrared light emitting diode.

Alternatively, the light emitting part 250 may be configured to transmit a structured light having a specific pattern according to control of the signal processing part 210.

The light receiving part 260 may include a laser light receiving sensor or an infrared light receiving sensor, and may be configured to receive photo signals from other robots and provide electric signals corresponding to the photo signals to the signal processing part 210. Here, the light receiving part 260 may include a filter which can separate received photo signals into photo signals including identification information and photo signals not including identification information, and may provide electric signals corresponding to only the photo signals including identification information to the signal processing part 210.

When the robot has a plurality of light emitting parts and a plurality of light receiving parts, each of the light emitting parts and each of the light receiving parts may be paired as emitting/receiving pair 270. Each pair may be installed as a module, or installed adjacently in the robot.

Also, emitting/receiving pairs 270 may be configured to transmit photo signals and receive photo signals in omni-direction. Thus, transmit angle of each emitting part of pairs may be adjusted to transmit photo signals in omni-direction, and receive angle of each receiving part of pairs may be adjusted to receive photo signals from omni-direction. Alternatively, when transmit angle or receive angle cannot be adjusted to a specific angle, the number of pairs and spaces between pairs may be determined in consideration of transmit angle and receive angle of each emitting part and receiving part.

Also, installation positions and/or spaces between pairs may be determined according to transmit angle and receive angle of each emitting part and receiving part and an outward appearance of the robot 200.

In the robot 200 (the apparatus for measuring position) according to an example of the present invention of FIG. 2, the signal processing part 210 is shown to be configured to control a plurality of light emitting parts 250, and each light emitting part is shown to be configured to transmit a photo signal in response to control of the signal processing part 210. However, a configuration of the apparatus according to the present invention is not limited to the configuration shown in FIG. 2. That is, a technical thought proposed in the present invention may be applied to any apparatus configured to transmit photo signals including unique identification information for each direction of all the directions.

For example, each emitting/receiving pair may be configured to include an independent function or component for signal processing independently of control of the signal processing part 210. In this case, each pair may perform light emitting operation independently, perform signal processing on photo signals received from other robots separately, acquire positional information of other robots, and transfer the acquired positional information to other components in the robot 200 which uses the positional information.

Figure 3:
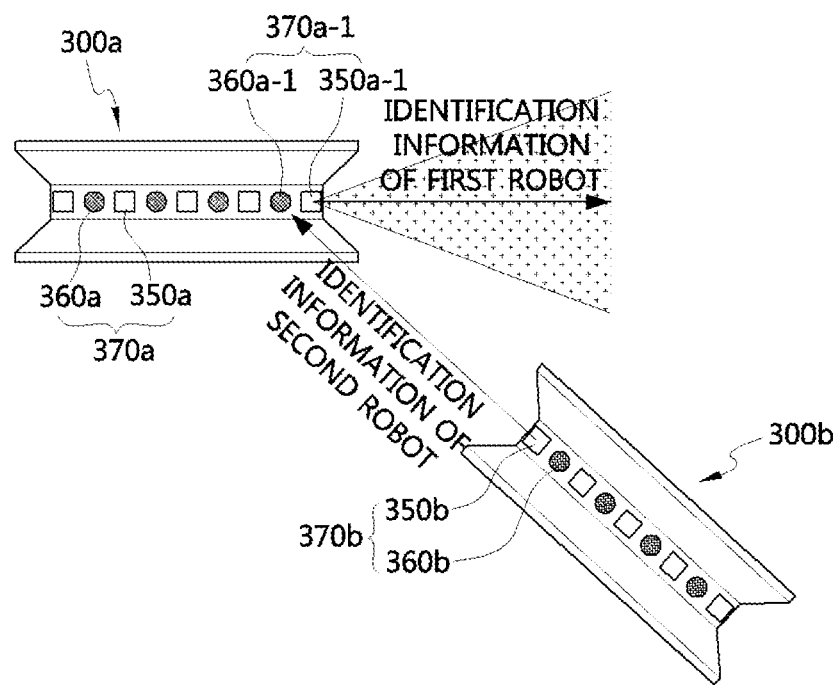
FIG. 3 is a conceptual diagram to explain a configuration and an operation of an apparatus for measuring position according to an example embodiment of the present invention.

FIG. 3 is a conceptual diagram to explain a configuration and an operation of an apparatus for measuring position according to an example embodiment of the present invention.

FIG. 3 shows a configuration and an operation of the apparatus for measuring position when the apparatus is implemented as a robot. When a first robot 300a and a second robot 300b are located in a predetermined area, the first robot 300a is assumed to measure position of the second robot 300b, and the second robot 300b is assumed to measure position of the first robot 300a.

Referring to FIG. 3, the first robot 300a and the second robot 300b are assumed to have components shown in FIG. 2. The components included in each of the robots 300a and 300b are assumed to have the same functions with the robot 200 explained by referring to FIG. 2. Also, the first robot 300a and the second robot 300b are assumed to have horizontal cross section of circular shapes (or they have cylindrical shapes) as shown in FIG. 3.

Each of the robot 300a and 300b may have a plurality of light emitting parts 350a and 350b, and a plurality of light receiving parts 360a and 360b. They may form emitting/receiving pairs 370a and 370b, and may be installed in circumferences of the corresponding robot with predefined spaces.

Here, a light emitting part 350a-1 included in a specific emitting/receiving pair 370a-1 among a plurality of pairs 370a installed in the first robot 300a may transmit a photo signal including an ID of the first robot 300a, an ID of the light emitting part 350a-1, and a transmit time of the photo signal.

The photo signal, with a property of straightness, transmitted from the light emitting part 350a-1 of the first robot 300a may be received by a specific light receiving part of the second robot 300b so that the photo signal may be used for the second robot 300b to acquire positional information of the first robot 300a.

However, when the second robot 300b is not located in optical path of the photo signal transmitted from the light emitting part 350a-1 of the first robot 300a, the second robot 300b may not receive the photo signal transmitted from the first robot 300a. In this case, the first robot 300a should transmit a photo signal using other light emitting parts.

Meanwhile, a light receiving part 360a-1 of the first robot 300a may receive a photo signal from the second robot 300b, and the second robot 300b may acquire an ID of the second robot 300b, an ID of light emitting part included in a specific emitting/receiving pair of a plurality of emitting/receiving pairs installed in the second robot 300b, and a transmit time of the photo signal, and may acquire a distance and an angle between itself (the first robot 300a) and the second robot 300b, and a pose information of the second robot 300b.

Figure 4A:
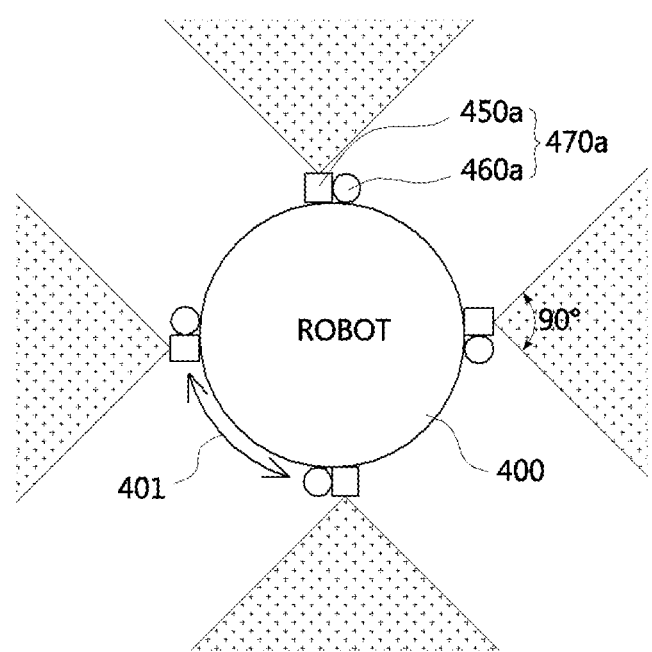
FIGS. 4A and 4B are conceptual diagrams to explain a method of installing light emitting parts and light receiving parts illustrated in FIG. 2.
Figure 4B:
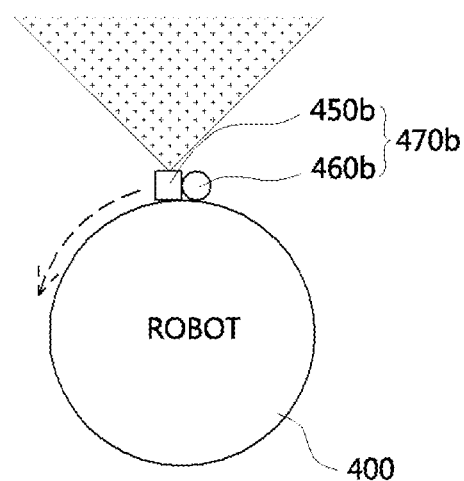

FIGS. 4A and 4B are conceptual diagrams to explain a method of installing light emitting parts and light receiving parts illustrated in FIG. 2.

FIG. 4A illustrates a case that a plurality of emitting/receiving pairs 470a is installed in a robot 400a as fixed, and FIG. 4B illustrates a case that a pair of light emitting/receiving parts 470b is installed in a robot 400b as it rotates along a circumference of the robot 400b.

First, referring to FIG. 4A, when an outward appearance of the robot 400a has a cylindrical shape (that is, when horizontal cross section of it has a circular shape), a plurality of emitting/receiving pairs 479a may be installed in circumference of the robot 400a with a predefined space. In this case, an angle of light transmitted from each light emitting part 450a may be determined according to the number of light emitting parts 450a or the emitting/receiving pairs 470a.

For example, when the number of the emitting/receiving pairs 470a is configured to be four as shown in FIG. 4A, angle of light transmitted from each light emitting part 450a included in each emitting/receiving pair 470a may be determined to 90 degrees. As generalization, when n light emitting parts (or n light emitting/receiving pairs 470a) are installed in the robot 400a, angle of light transmitted from each light emitting part 450a may be determined to (360/n) degrees.

In FIG. 4A, installation and light emitting angles of the light emitting/receiving pairs 470a were explained as an example when an outward appearance of the robot 400a has a cylindrical shape. However, installation and light emitting angles of the light emitting/receiving pairs 470a are not restricted to the above example for a robot having the cylindrical shape. It is obvious that the above installation method may be applied to any robots having various shapes.

On the other hand, as shown in FIG. 4B, the robot 400b also may have only one light emitting/receiving pair 470b. In this case, the pair 470b may be configured to rotate along a circumference of the robot 400b so as to receive photo signals from all directions or to receive a photo signal transmitted from a specific counterpart robot located in an arbitrary direction.

When the light emitting/receiving pair 470b is configured to rotate along a circumference of the robot 400b as shown in FIG. 4B, an emitting angle of light transmitted from the light emitting part 450b may be set differently according to a rotation speed of the pair 470b. For example, the lower the rotation speed of the pair 470b is, the larger the angle of light emitted from the light emitting part 450b is set to, and the higher the rotation speed of the pair 470b is, the narrower the angle of light emitted from the light emitting part 450b is set to. Alternatively, when a light emitting angle of the light emitting part 450b is fixed, the rotation speed of the pair 470b is configured to be set according to the fixed angle.

Although explained is an example in which only one light emitting/receiving pair 470b is installed to rotate along the circumference of the robot 400b, the number of rotating light emitting/receiving pairs 470b may not be restricted to one. That is, two or more than two light emitting/receiving pairs 470b may be installed to rotate along the circumference of the robot 400b according to shape of the robot 400b. For example, respective light emitting/receiving pair may be installed in front side and back side of the robot 400b, and they may be configured to rotate along the circumference of the robot 400b.

Figure 5A:
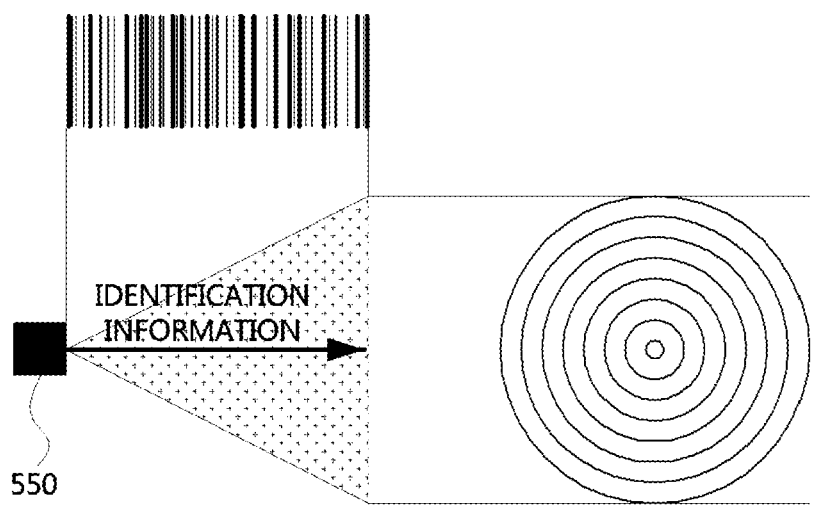
FIGS. 5A and 5B are conceptual diagrams to illustrate examples of light emitting pattern of light emitting part in an apparatus according to the present invention.
Figure 5B:
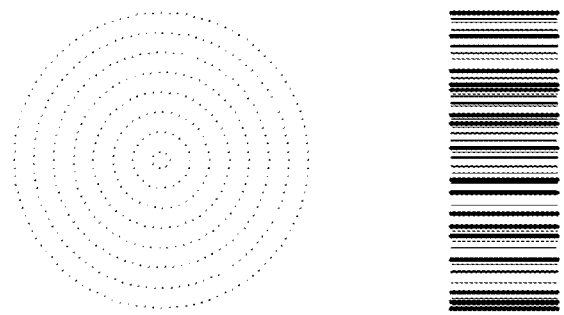

FIGS. 5A and 5B are conceptual diagrams to illustrate examples of light emitting pattern of light emitting part in an apparatus according to the present invention.

A light emitting part 550 installed in the apparatus (or, robot) according to an example of the present invention may transmit photo signals for general data communications as well as a photo signal including identification information.

FIGS. 5A and 5B illustrate a light emitting pattern of the light emitting part 550. FIG. 5A illustrates an example in which the light emitting part 550 transmits data or identification information by flickering, and FIG. 5B illustrates an example in which the light emitting part 550 transmits data or identification information by using structured light.

That is, as shown in FIG. 5A, the light emitting part 550 may transmit data or identification information (an ID of robot, an ID of light emitting part, and transmit time of photo signal) by flickering light emitting element such as a light emitting diode according to data or identification information to be transmitted. Here, the light emitting part 550 may perform the flickering operation according to data encoded in the signal processing part 210 of FIG. 2. Alternatively, the light emitting part 550 may comprise its own encoding mean, encode data or identification information to be transmitted, and perform the flickering operation according to the encoded data or identification information. The encoded data may further comprise information on intensity of light, duration of light emitting, and light emitting period.

Alternatively, as shown in FIG. 5B, the light emitting part 550 may be configured to generate structured light according to the data to be transmitted. Here, the signal processing part 210 of FIG. 2 may determine a light emitting pattern according to the data or identification information to be transmitted, and provide the determined light emitting pattern to the light emitting part 550 in order for the light emitting part 550 to generate structured light according to the provided light emitting pattern. Alternatively, the light emitting part 550 may determine the light emitting pattern corresponding to the provided data or identification information based on a predefined rule, and generate structured light according to the determined light emitting pattern.

For example, when the photo signal is transmitted as the structured light, as shown in FIG. 5B, the light emitting part 550 may generate lights with different spaces according to the data or identification information to be transmitted so that it can transmit the data or the identification information, or transmit the data and the identification information at the same time.

On the other hand, when a robot receives structured light from a counterpart robot or other robot, a light receiving part of the robot analyze the received structured light so as to obtain data or identification information represented by the structured light. Then, the light receiving part of the robot may provide the obtained data or identification information to a signal processing part of the robot. Alternatively, the light receiving part of the robot may provide electric signal corresponding to the received structured light, and the signal processing part may decode the electric signal so as to obtain the data or identification information.

Figure 6:
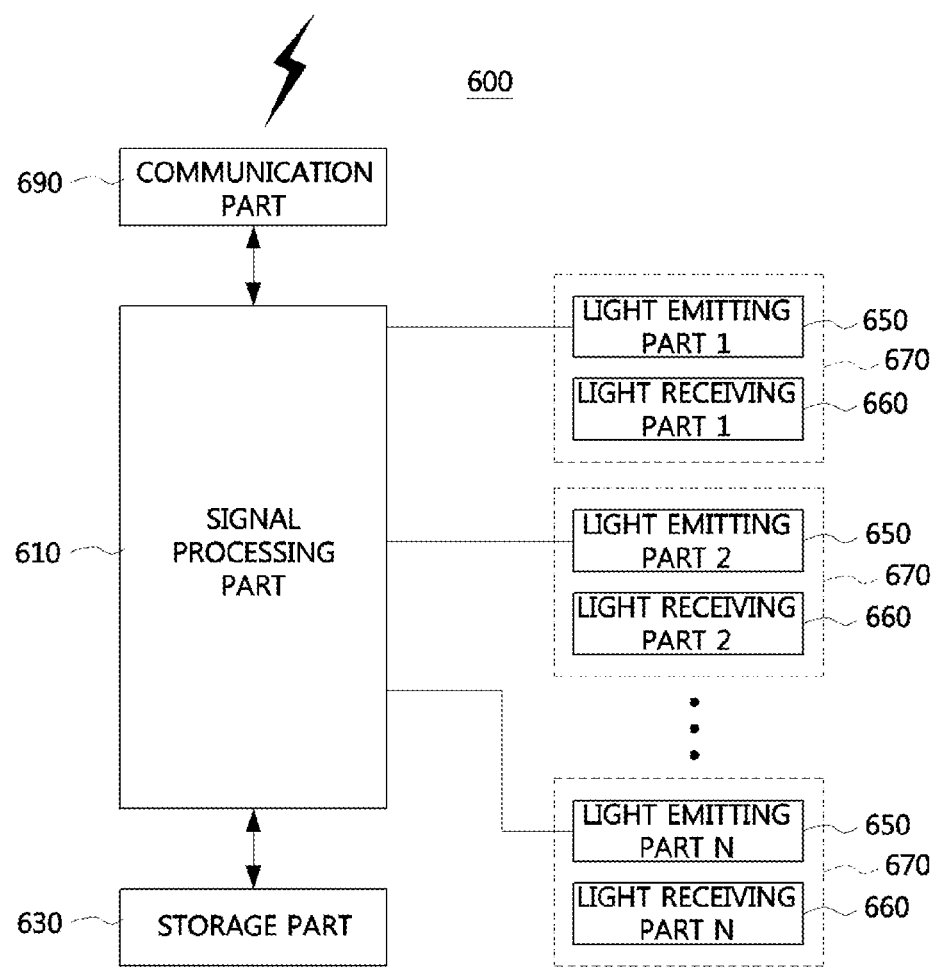
FIG. 6 is a block diagram to illustrate a configuration of an apparatus for measuring position according to another example of the present invention.

FIG. 6 is a block diagram to illustrate a configuration of an apparatus for measuring position according to another example of the present invention.

Referring to FIG. 6, an apparatus 600 for measuring position according to another example of the present invention may comprise a signal processing part 610, a storage part 630, at least one light emitting part 650, at least one light receiving part 660, and a communication part 690. The apparatus 600 may have a plurality of light emitting parts 650 and a plurality of light receiving parts 660. In this case, each of light emitting parts and each of light receiving parts may form emitting/receiving pairs 670, and be installed in the apparatus 600 so as to transmit photo signals to all directions.

The apparatus 600 may be implemented as a mobile or vehicular apparatus such as a robot, and may include additional components performing fundamental functions of robot when it is implemented as a robot.

Hereinafter, the apparatus 600 may be assumed to be implemented as a robot, and the apparatus 600 may be referred to as 'robot 600' for convenience of explanation. Also, other apparatus position of which is measured by the apparatus 600 may be assumed to be implemented as a robot, and may be referred to 'counterpart robot' for convenience of explanation.

The signal processing part 610 may be implemented using a processor, and may control operations of the at least one light emitting part 650, the at least one light receiving part 660, and the communication part 690. Also, the signal processing part 610 may perform a signal processing to acquire positional information of the counterpart robot based on photo signal received from the counterpart robot through the light receiving part 660.

Specifically, the signal processing part 610 may control the light emitting part 650 to transmit a photo signal including identification information for other apparatus (counterpart robot) to measure position of the robot 600 in a predefined manner. Here, the identification information may comprise only an ID of the robot 600 as opposed to the example embodiment shown in FIG. 2. That is, although the photo signal is transmitted as it includes identification information such as an ID of robot, an ID of light emitting part, and a transmit time of the photo signal in an example embodiment of the present invention shown in FIG. 2, the photo signal including only the ID of robot 600 may be transmitted in another example embodiment as shown in FIG. 6.

The signal processing part 610 may transmit a message directing the counterpart apparatus to pause movement through the communication part 690 after receiving a photo signal including an ID of the counterpart robot. Then, the signal processing part 610 may transmit a photo signal by controlling the light emitting part 650 in order to measure distance and pose of the counterpart robot which paused movement according to the message, or acquire positional information of the counterpart robot based on a photo signal received from the counterpart robot. For example, the signal processing part 610 may be configured to acquire the positional information of the counterpart robot based on information for measuring position included in the photo signal transmitted from the counterpart robot. Here, the information for measuring position may include information to be used for the robot 600 to determine distance, angle, and pose of the counterpart robot.

On the other hand, the signal processing part 610 may receive a message directing to stop movement from other robots through the communication part 690, make the robot 600 to pause stop movement according to the message, and perform a signal processing corresponding to photo signals received from other robots, and control at least one light emitting part to transmit a photo signal to be used for measuring position of itself to other robots.

That is, the apparatus according to another example embodiment may be configured to control the light emitting part 650, the light receiving part 660, and the communication part 690 to measure positions of other robots, and perform a procedure of measuring positions. Especially, in another example embodiment, information related to measurement of position may be transmitted and received through the communication part 690. For example, in another example embodiment, the message directing to pause movement of the robot or the counterpart robot may be transmitted and received through the communication part 690. In addition, various information, such as a current direction of robot, a transmit angle of photo signal, a transmit time of photo signal, absolute coordinate of robot in map, may be transmitted and received through the communication part 690. Also, any control signal for measuring position may be transmitted and received through the communication part 690.

The storage part 630 may be configured with a non-volatile memory (such as a flash memory), and store identification information (that is, an ID of robot 600). Also, the storage part 630 may store identification information of other robots, a program code performing a method for measuring position based on the identification information of other robots, and positional information of other robots acquired through execution of the program code.

A single light emitting part may be used, or a plurality of light emitting parts may be used. The light emitting part may include at least one light emitting element capable of transmitting the photo signal. Here, it is preferable that each light emitting part 650 is configured to generate photo signals having property of straightness such as laser or infrared signal. Thus, the light emitting part may comprise a laser light emitting diode or an infrared light emitting diode.

The light emitting part 650 may perform light emitting operation under control of the signal processing part 610. For example, the light emitting part 650 may transmit a photo signal including identification information by flickering light emitting element as shown in FIG. 5A. Alternatively, the light emitting part 650 may be configured to transmit a photo signal as structured light having a specific pattern as shown in FIG. 5B.

The light receiving part 660 may comprise at least one light receiving element in which current flows as corresponding to intensity of received light, such as laser light receiving sensors and infrared light receiving sensors.

The light receiving part 660 may receive photo signals from other robots and provide electric signals corresponding to the photo signals to the signal processing part 610.

When the robot has a plurality of light emitting parts 650 and a plurality of light receiving parts 660, each of the light emitting parts and each of the light receiving parts may be paired as emitting/receiving pair 670. Also, the emitting/receiving pairs 670 may be configured to transmit photo signals and receive photo signals omni-directionally. Thus, transmit angle of each emitting part of pairs may be adjusted to transmit photo signals omni-directionally, and receive angle of each receiving part of pairs may be adjusted to receive photo signals from omni-direction. Alternatively, when transmit angle or receive angle cannot be adjusted to a specific angle, the number of pairs and spaces between pairs may be determined in consideration of transmit angle and receive angle of each emitting part and receiving part.

Also, installation positions and/or spaces between pairs may be determined according to transmit angle and receive angle of each emitting part and receiving part and an outward appearance of the robot 600.

Figure 7:
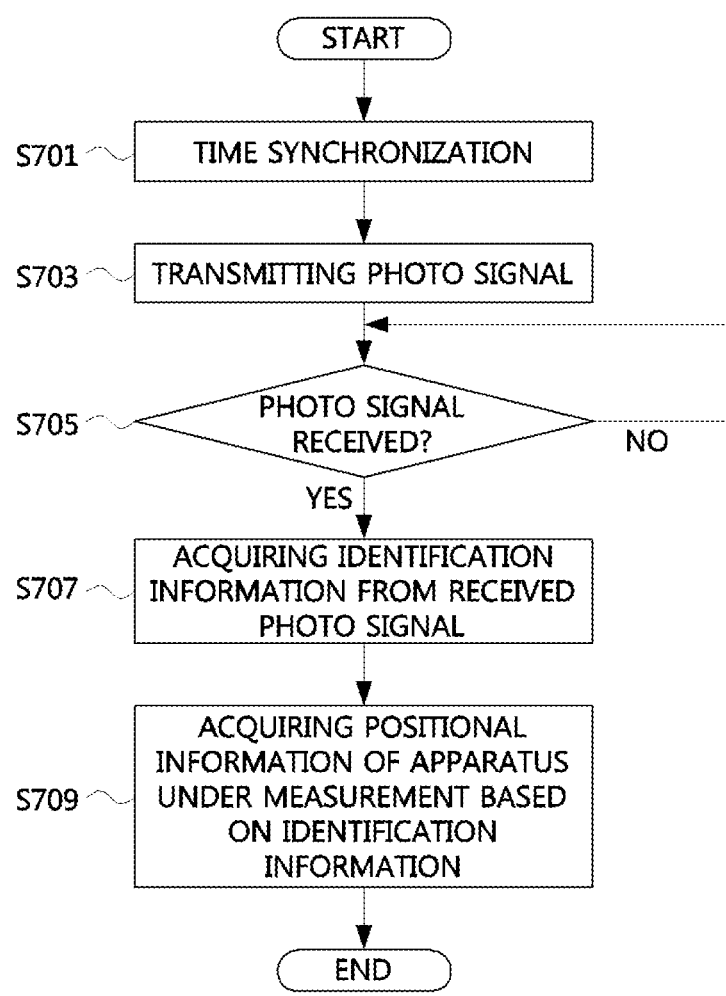
FIG. 7 is a flow chart to illustrate a method for measuring position according to an example embodiment of the present invention.

FIG. 7 is a flow chart to illustrate a method for measuring position according to an example embodiment of the present invention.

The method shown in FIG. 7 may be performed by an apparatus for measuring position, or may be performed by a robot when the apparatus is implemented as the robot or included in the robot as a component of the robot.

Referring to FIG. 7, the apparatus for measuring position may perform a procedure of time synchronization for measuring position at S701. Here, the time synchronization may be established using various known methods such as a global positioning system (GPS).

Then, the apparatus may transmit a photo signal including identification information at S703. The apparatus may be configured to transmit the photo signal according to preconfigured transmission schedule, or only when a specific event occurs. Also, the identification information may include a unique identification information of the apparatus (for example, an ID of the robot), a unique identification information of light emitting part transmitting the photo signal (for example, an ID of the light emitting part), and a transmit time information of the photo signal. Alternatively, when the apparatus comprises only one light transmitting part and the light emitting part is configured to rotate along a circumference of the apparatus, the identification information may include a position (or an angle) of the light emitting part at a time when the light emitting part transmits the photo signal.

On the other hand, the apparatus may perform monitoring on whether a photo signal is received from other apparatus at S705, and acquire identification information of other apparatus from the photo signal received from other apparatus at S707. The identification information of other apparatus may include a unique identification of other apparatus under measurement, a unique identification of light emitting part transmitting the photo signal in the apparatus under measurement, and a transmit time of the photo signal transmitted from the apparatus under measurement. Alternatively, when the apparatus under measurement comprises only one light transmitting part configured to rotate along a circumference of the apparatus under measurement, information on a position (or an angle) of the light emitting part in the apparatus under measurement at a time when the light emitting part transmits the photo signal may be obtained from the photo signal.

Then, the apparatus may acquire positional information of the apparatus under measurement based on the identification information of the apparatus under measurement at S709. The apparatus may calculate a distance from the apparatus to the apparatus under measurement based on difference between a receive time of the photo signal and the transmit time of the photo signal included in the identification information. Also, the apparatus may calculate an angle of the apparatus under measurement based on position and angle of light receiving part which receives the photo signal. Also, the apparatus may acquire the pose of the apparatus under measurement (or, information on direction for which the apparatus under measurement is heading) based on position and angle of light emitting part in the apparatus under measurement included in the acquired identification information.

In a flow chart shown in FIG. 7, a processing order of step S703 is not restricted to a specific order. That is, the step S703 that the apparatus transmits a photo signal including identification information may be performed at arbitrary time after the step S701 of time synchronization, or according to a predetermined schedule.

According to an apparatus for measuring position of a counterpart apparatus and a method for the same, identification information, including a unique identification information of the apparatus, a unique identification information of a light emitting part transmitting a photo signal in the apparatus, and transmit time information of the photo signal, may be transmitted through the photo signal by the apparatus. In addition, the apparatus may receive a photo signal transmitted from the counterpart apparatus, acquire identification information for measuring position of the counterpart apparatus, and acquire information on distance to the counterpart apparatus, an angle of the counterpart apparatus from the apparatus, and pose of the counterpart apparatus based on the acquired identification information.

Thus, each apparatus located in an arbitrary space may accurately acquire relative positional information of counterpart apparatuses such as distance, angle, and pose of each of counterpart apparatuses.

Also, various tasks assigned for each apparatus such as mapmaking, object searching, autonomous driving, and logistics automation may be performed efficiently based on the positional information acquired by each apparatus by the above described method.

While the example embodiments of the present invention and their advantages have been described in detail, it should be understood that various changes, substitutions and alterations may be made herein without departing from the scope of the invention.

What is claimed is:

1. An apparatus for measuring position of a counterpart apparatus, the apparatus comprising:
at least one light emitting part transmitting a first photo signal;
at least one light receiving part receiving a second photo signal from the counterpart apparatus; and
a signal processing part controlling the at least one light emitting part to transmit the first photo signal including first identification information of the apparatus, acquiring second identification information of the counterpart apparatus based on the second photo signal received from the counterpart apparatus, and acquiring positional information of the counterpart apparatus based on the acquired second identification information of the counterpart apparatus,
wherein the apparatus and the counterpart apparatus are mobile apparatuses.

2. The apparatus of claim 1, wherein the first identification information included in the first photo signal transmitted by the at least one light emitting part includes at least one of a unique identification of the apparatus, a unique identification of the at least one light emitting part, and a transmit time of the first photo signal including the first identification information.

3. The apparatus of claim 1, wherein the signal processing part acquires at least one of a unique identification of the counterpart apparatus, a unique identification of a light emitting part equipped in the counterpart apparatus, and a transmit time of the second photo signal transmitted by the counterpart apparatus based on the second photo signal received from the counterpart apparatus.

4. The apparatus of claim 3, wherein the signal processing part acquires a distance between the apparatus and the counterpart apparatus based on the transmit time of the second photo signal transmitted by the counterpart apparatus and a receive time of the second photo signal received by the apparatus.

5. The apparatus of claim 3, wherein the signal processing part acquires pose information of the counterpart apparatus based on the unique identification of the light emitting part equipped in the counterpart apparatus, the pose information including information on a direction for which the counterpart apparatus is heading.

6. The apparatus of claim 3, wherein the signal processing part acquires information on a direction angle of the counterpart apparatus from the apparatus based on position and angle of a light receiving part, which receives the second photo signal from the counterpart apparatus, among the at least one light receiving part.

7. The apparatus of claim 1, wherein the at least one light emitting part and the at least one light receiving part are configured to rotate along circumference of the apparatus, and the first identification information includes information on position of the at least one light emitting part at a time when the at least one light emitting part transmits the first photo signal including the first identification information.

8. The apparatus of claim 1, wherein the at least one light emitting part transmits the first photo signal by performing a flickering operation corresponding to the first identification information included in the first photo signal, or transmits the first photo signal using structured light having a specific pattern corresponding to the first identification information included in the first photo signal.

9. The apparatus of claim 1, wherein the apparatus comprises a plurality of light emitting parts and a plurality of light receiving parts, and the plurality of light emitting parts and the plurality of light receiving parts form emitting/receiving pairs each of which comprises a light emitting part and a light receiving part, a transmit angle of a photo signal emitted from each light emitting part included in each of the emitting/receiving pairs being determined according to a total number of the emitting/receiving pairs.

10. A method for measuring position of a counterpart apparatus, performed in an apparatus, the method comprising:
- transmitting a first photo signal including first identification information of the apparatus;
- receiving a second photo signal from the counterpart apparatus;
- acquiring second identification information of the counterpart apparatus based on the second photo signal received from the counterpart apparatus; and
- acquiring positional information of the counterpart apparatus using the acquired second identification information of the counterpart apparatus,
- wherein the apparatus and the counterpart apparatus are mobile apparatuses.

11. The method of claim 10, wherein the first photo signal includes at least one of a unique identification of the apparatus, a unique identification of a light emitting part transmitting the first photo signal, and a transmit time of the first photo signal.

12. The method of claim 10, wherein the second identification information of the counterpart apparatus includes at least one of a unique identification of the counterpart apparatus, a unique identification of a light emitting part equipped in the counterpart apparatus, and a transmit time of the second photo signal transmitted by the counterpart apparatus.

13. The method of claim 12, wherein a distance between the apparatus and the counterpart apparatus is acquired based on a receive time of the second photo signal received by the apparatus and the transmit time of the second photo signal transmitted by the counterpart apparatus.

14. The method of claim 12, wherein pose information of the counterpart apparatus is acquired based on the unique identification of the light emitting part equipped in the counterpart apparatus, the pose information including information on a direction for which the counterpart apparatus is heading.

15. The method of claim 12, wherein information on a direction angle of the counterpart apparatus from the apparatus is acquired based on position and angle of a light receiving part receiving the second photo signal from the counterpart apparatus in the acquired positional information.

16. The method of claim 10, wherein the transmitting of the first photo signal comprises one of:
- transmitting the first photo signal using structured light having a specific pattern corresponding to the first identification information included in the first photo signal; and
- transmitting the first photo signal by performing a flickering operation corresponding to the first identification information included in the first photo signal.

17. The method of claim 10, wherein, when the apparatus comprises a light emitting part, the transmitting of the first photo signal comprises transmitting the first photo signal using the light emitting part that rotates along circumference of the apparatus, and the first identification information includes information on position of the light emitting part at a time when the light emitting part transmits the first photo signal including the first identification information.

* * * * *